Patented Sept. 6, 1949

2,481,339

UNITED STATES PATENT OFFICE 2,481,339

DRILLING FLUID COMPOSITION

Charles S. Penfield, Bakersfield, Calif., assignor to Shell Development Company, San Francisco, Calif., a corporation of Delaware No Drawing. Application July 1, 1947,
Serial No. 758,471

5 Claims. (Cl. 252—8.5)

This invention pertains to the drilling of oil wells, and relates more particularly to a method and composition for preventing or minimizing the loss of drilling fluid from the well into the formation.

An essential feature in the rotary drilling of oil wells is the use of a drilling fluid or mud, consisting of a suspension in a suitable liquid, such as water or oil, of material such as clay or calcium carbonate, sometimes weighted down with additional comminuted heavy material such as barytes, galena, red lead, crushed oyster shells, etc.

The functions of the drilling fluid are to lubricate the bit, to carry the cuttings up to the surface, to furnish a static head of liquid which overcomes formation pressures, and to form on the walls of the borehole a sheath capable of preventing or minimizing the penetration of the drilling fluid into the formation, and its loss therein.

As the drilling fluid is usually circulated in the borehole under a pressure generally exceeding that of the formation, its liquid component, together with the smaller colloidal or solid particles suspended therein, flows into the formation through the interstices, passages and pores between the grains of the formation sands. The larger clay or solid particles, however, tend to become arrested between adjacent sand grains and act as plugs, decreasing the size of the flow passages therebetween, and allowing the smaller clay particles to become in turn arrested and to act as plugs in said passages. A drilling mud of good plastering properties quickly forms, in this manner, a substantially liquid-impervious mudsheath on the walls of the borehole.

In many cases, however, the amounts of the drilling fluid lost from the borehole to the formation depend less on the plastering properties of the drilling mud than on the structural characteristics of the strata traversed by the well.

Thus, in formations having fissures, cavities or crevices, and especially in low pressure, coarse-grained, porous formations, the solid particles ordinarily present in the drilling mud easily pass through the interstices between adjacent grains of sand or gravel without exerting any plugging action, with the result that large volumes of the expensive drilling mud are carried into the formations and lost, causing a loss of circulation of the mud, which may in turn lead to the freezing of the drill string, the collapse of the walls of the borehole, or other undesirable consequences.

When such formations are drilled through, an attempt is made to prevent the loss of the drilling mud and the circulation thereof, by adding various materials such as cotton seed hulls, mica flakes, sawdust, Celluloid or cellophane flakes, ground natural rubber or gutta-percha, etc., to the mud and circulating the material-laden mud down the borehole until the particles of material plug the cavities or porous formation and prevent any further loss of drilling mud thereto.

However, even the most effective of the materials that have been suggested for use in drilling muds for preventing loss of circulation, such as Celluloid, cellophane and natural rubber, possess one or more of the following undesirable properties:

(1) These materials usually have densities considerably smaller than the densities of commonly used muds. Thus, natural rubber has a density of 0.91. A material having a density substantially less than that of mud to which it is admixed will have a tendency to separate therefrom and may be difficult to incorporate in the mud. At the same time it lowers the overall density of the mud, thus making it necessary to add further weighting material.

(2) The physical characteristics of most of these materials are such that they are unable to withstand any substantial amount of abrasion without being ground into a finely divided pulp or dust. When a drilling mud is circulated through the drill string, drill bit and borehole, the larger particles are commonly subjected to varying amounts of abrasive action which converts said particles into finely comminuted particles which are capable of little plugging or sealing action and are readily washed through the openings of a porous formation.

(3) The physical and chemical properties of many materials, and particularly natural rubber are unfavorably affected by oil and/or petroleum products which tend to partially or completely disintegrate said materials. Materials that are thus affected by oil cannot be used effectively in oil base muds, in oil base drilling emulsions or in any drilling mud where they may come in contact with oil from the producing zone of the well.

(4) The original size of most particles of materials that have been suggested is so small that inadequate bridging action is furnished by these particles in all but the relatively smallest pores and cavities. The present invention proposes the addition of small pieces of synthetic rubber to a drilling fluid, said synthetic rubber acting as a plugging material in closing formation cavities and porous formations. Synthetic rubber has been found to be an ideal material for use in drilling muds as it does not exhibit any of the above-mentioned undesirable characteristics of other proposed plugging materials.

It is, therefore, an object of the present invention to provide a method for sealing off coarse-grained porous formations by means of a drilling mud having added thereto a synthetic rubber which has a relatively large particle size and which is substantially unaffected by oil, said drilling mud being capable of forming a substantially water-impervious mudsheath adhering to the walls of the borehole.

It is also an object of this invention to provide for this purpose a drilling mud to which relatively large size resilient particles of synthetic rubber are added for sealing purposes, said particles not being susceptible to disintegration by any abrasive action encountered during circulation in the well, or to attack and disintegration by oils used in the drilling mud or encountered in the oil bearing formation.

Synthetic rubber is manufactured by a variety of processes, the resulting products of which are organic substances which are similar physically to natural rubber in that they all possess the property of reverting to approximately their original size and shape after being greatly distorted. As they also regain their original shape after being compressed, small pieces of synthetic rubber are not readily ground up or destroyed by abrasive action during circulation in the borehole of a well as are other materials. Thus, synthetic rubber particles of a definite size may be selected for admixture with a drilling mud with considerable assurance that the full size of the original particles will be utilized in plugging the formations.

The following synthetic rubbers represent some of the various types that are commercially manufactured at this time: "Neoprene", a trade name for a polymer of 2-chloro-1,3-butadiene; "Thiokol" and "Perduren", trade names for the reaction products of sodium polysulfide and ethylene dichloride or other chlorine-containing derivatives; "Chemigum" and "Hycar O. R.", trade names for the reaction products of butadiene and acrylonitrile; Buna-S, a copolymer of butadiene with styrene, etc. Some of the above-named classes or families of synthetic rubbers may be subdivided into a series of synthetic rubbers that have been developed from somewhat similar materials. Thus, three of the many types of "Thiokol" that have been developed are "Thiokol" A, B and F, which are the reaction products of sodium polysulfide with ethylene dichloride, dichloroethyl ether and dichloroethyl formol respectively.

All these synthetic rubbers have a density that is greater than natural rubber whose density is 0.91. The densities of the synthetic rubbers under consideration range, for example, as follows: "Neoprene" (about) 1.25, "Thiokol" 1.03 to 1.60, "Perduren" 1.17 to 1.68, "Chemigum" 1.06, "Hycar O. R." 1.00, etc. The fact that synthetic rubbers possess varying densities is extremely important to the present invention as a synthetic rubber, to be admixed to a drilling mud, may be selected having a weight or density equal or close to the weight of the mud being used in the drilling operations. Hence, for use in average weight (70 to 90 lbs. per cu. ft.) drilling muds, a synthetic rubber having a density between 1.12 and 1.44 may be admixed therewith. For use in muds lighter than 70 lbs. per cu. ft. synthetic rubbers having a density between 1.00 and 1.12 may be used; heavy muds above 90 lbs. may be admixed with the heavier "Thiokol" and "Perduren" rubbers having densities above 1.44. By adding pieces of rubber having the same density as the mud to which they are added, there will be a greater tendency for the pieces to stay in suspension. Although it is not intended that this should limit rigidly the selection of a particular type of synthetic rubber, it is preferred that the synthetic rubber being added should have a density of at least 1.00. The addition of lighter rubbers is undesirable as it would require the additions of larger amounts of the heavier weighting materials so as to maintain the desired overall weight of the mud. The additional material may cause undesirable changes in the viscosity of the drilling mud. A rubber with a density less than that of the mud also has an undesirable tendency to float on top of the mud making it very difficult to introduce into the mud stream.

Besides having densities greater than natural rubber and water and equal to that of drilling muds, many synthetic rubbers have the additional desirable quality of being highly resistant to the solvent action of oil and other organic liquids. In modern rotary drilling procedure, it is common practice to employ oil base drilling fluids and oil and water drilling emulsions especially when drilling in formations of heaving shale and when drilling in the producing zone of the well. Such drilling fluids, containing relatively high amounts of oil, may have pieces of most types of synthetic rubber added to them to act as a cavity sealing material. The preferred types of synthetic rubbers to be added to oil base or emulsion type drilling fluids are the oil-resistant types that are not affected by the solvent action of oil or other organic fluids. It may also be found preferable to use these rubbers in water base muds when drilling through the oil producing formation. Synthetic rubbers are also generally unaffected by and resist the deteriorating action of the high temperatures that are often encountered during the drilling of deep wells and are in this regard also greatly preferable to natural rubber.

An added advantage of using pieces of synthetic rubber in a drilling fluid is that it is possible to select the size of rubber particles needed to seal a certain formation as the synthetic rubber may be cut up, divided or reduced to particles of whatever size and shape desired. Synthetic rubber particles of irregular shape having all dimensions between 1/8 and 1/4 of an inch are preferred for use in the method of the present invention. Since the pieces of synthetic rubber that may be cut and used are generally larger than most formation plugging materials normally incorporated in drilling muds, these larger particles exhibit an increased "bridging" characteristic, i. e. the ability of the particles of material to form a bridge in the formation pore or crevice while the regular finely ground components in the drilling mud seal the interstices between the particles of the bridge. After completing the use of a drilling fluid of this invention it is possible to salvage much of the rubber remaining in the fluid, the large size and character of the particles facilitating their separation from the fluid.

According to the present invention, there should be added to the usual water or oil base mud of normal colloidal properties a suitable quantity of preferably irregular pieces of an oil-resistant synthetic rubber, such as from 1% to 5% by weight.

Although the finely ground components such as clay, barytes, crushed oyster shells and the like, effectively close the interstices between the pieces of synthetic rubber, other materials such as asbestos fibers, bagasse and the like may also be added to the drilling mud to seal or close the larger interstices. The term synthetic rubber as used in the claims also includes any mixtures of natural and synthetic rubbers in which more than 50% by weight of the rubber present is an oil-resistant synthetic rubber. The term oil base fluid generally includes drilling emulsions in which mineral oil forms at least 25% of the liquid phase although drilling fluids containing as little as 10% oil have been used.

I claim as my invention:

1. In the drilling of oil wells, the method of overcoming loss of circulation comprising the steps of adding small pieces of an oil-resistant synthetic rubber to the drilling fluid, circulating the resultant composition in the well in contact with the face of a porous formation and causing said composition to form a substantially fluid-impervious sheath on the face of said formation.

2. In the process of drilling oil well boreholes, the steps of circulating an oil base drilling fluid comprising small pieces of an oil-resistant synthetic rubber in the borehole while drilling through a porous formation and causing said composition to form a substantially fluid-impervious sheath on the face of said formation.

3. A drilling fluid composition for forming a mudsheath over the face of porous formations traversed by a well, comprising a drilling fluid having added thereto from 1% to 5% by weight of small pieces of an oil-resistant synthetic rubber added thereto.

4. A drilling fluid composition for forming a mudsheath over the face of porous formations traversed by a well, comprising an oil-base drilling fluid having added thereto from 1% to 5% by weight of small pieces of an oil-resistant synthetic rubber having a density of at least 1.0.

5. A drilling composition for filling and sealing cavities in formations traversed by a well and for forming a mudsheath on said formations, comprising a drilling fluid having added thereto from 1% to 5% by weight of small pieces of an oil-resistant synthetic rubber having a density of at least 1.0.

CHARLES S. PENFIELD.

REFERENCES CITED

The following references are of record in the file of this patent:

UNITED STATES PATENTS

| Number | Name | Date |
|---|---|---|
| 2,033,509 | Bowie | Mar. 10, 1936 |
| 2,064,936 | McQuiston | Dec. 22, 1936 |
| 2,342,588 | Larkin | Feb. 22, 1944 |
| 2,353,372 | Stone | July 11, 1944 |
| 2,398,347 | Anderson | Apr. 16, 1946 |

OTHER REFERENCES

Bowie, Hardening of Mud Sheaths, Article in The Oil Weekly, January 3, 1938, pages 32, 34, and 35.

Bowie, Hardening of Mud Sheaths in Contact with Oil, Bureau of Mines Report of Investigations No. 3354, November 1937, 25 pages of printed matter, 4 pages of drawings and photographs.